US010325007B2

(12) United States Patent
Gokmen et al.

(10) Patent No.: US 10,325,007 B2
(45) Date of Patent: Jun. 18, 2019

(54) NOISE AND BOUND MANAGEMENT FOR RPU ARRAY

(71) Applicant: INTERNATIONAL BUSINESS MACHINES CORPORATION, Armonk, NY (US)

(72) Inventors: Tayfun Gokmen, Briarcliff Manor, NY (US); Oguzhan Murat Onen, Ankara (TR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 15/479,561

(22) Filed: Apr. 5, 2017

(65) Prior Publication Data

US 2018/0293208 A1     Oct. 11, 2018

(51) Int. Cl.
| | | |
|---|---|---|
| *G06G 7/16* | (2006.01) | |
| *G06N 3/08* | (2006.01) | |
| *G06F 17/16* | (2006.01) | |
| *G06F 7/523* | (2006.01) | |
| *G06F 7/535* | (2006.01) | |
| *G06F 7/544* | (2006.01) | |
| *G06N 3/063* | (2006.01) | |

(52) U.S. Cl.
CPC ............. *G06F 17/16* (2013.01); *G06F 7/523* (2013.01); *G06F 7/535* (2013.01); *G06F 7/5443* (2013.01); *G06G 7/16* (2013.01); *G06N 3/08* (2013.01); *G06F 2207/4814* (2013.01); *G06F 2207/4824* (2013.01); *G06F 2207/4828* (2013.01); *G06N 3/0635* (2013.01)

(58) Field of Classification Search
None
See application file for complete search history.

(56) References Cited

U.S. PATENT DOCUMENTS

| | | |
|---|---|---|
| 3,476,954 A | 11/1969 | Wennik et al. |
| 5,235,672 A | 8/1993 | Carson |
| 5,263,120 A | 11/1993 | Bickel |
| 5,319,738 A | 6/1994 | Shima et al. |
| 6,385,079 B1 | 5/2002 | Tran |

(Continued)

OTHER PUBLICATIONS

Badri, Lubna, "Development of Neural Networks for Noise Reduction", The International Arab Journal of Information Technology, Jul. 2010, pp. 289-294, vol. 7, No. 3.

(Continued)

*Primary Examiner* — Michael D. Yaary
(74) *Attorney, Agent, or Firm* — Tutunjian & Bitetto, P.C.; Vazken Alexanian

(57) ABSTRACT

A method, computer program product, and circuit are provided for noise and bound management for a Resistive Processing Unit (RN) array having an op-amp. The method includes reducing the noise in an output signal from the RPU array by using a largest value, in a sigma vector having a plurality of values, as a representation for a window for an input signal to the RPU array. The input signal to the RPU array is formed from the plurality of values. The method further includes sensing saturation at an output of the op-amp. The method also includes managing the bound to eliminate the saturation by reducing the plurality of values from which the input sign to the RPU is formed.

9 Claims, 12 Drawing Sheets

(56) References Cited

U.S. PATENT DOCUMENTS

| | | | |
|---|---|---|---|
| 6,456,525 B1* | 9/2002 | Perner | G11C 11/16 |
| | | | 257/E27.005 |
| 6,946,882 B2* | 9/2005 | Gogl | G11C 7/067 |
| | | | 327/53 |
| 2007/0233761 A1* | 10/2007 | Mouttet | G06F 7/607 |
| | | | 708/204 |
| 2015/0106306 A1 | 4/2015 | Birdwell et al. | |
| 2015/0170025 A1 | 6/2015 | Wu et al. | |
| 2015/0178619 A1 | 6/2015 | Nishitani et al. | |

OTHER PUBLICATIONS

Gokmen, et al., "Acceleration of Deep Neural Network Training with Resistive Cross-Point Devices", arxiv.org, Mar. 2016, pp. 1-19.

Gokmen, et al., "Acceleration of Deep Neural Network Training with Resistive Cross-Point Devices: Design Considerations", Frontiers in Neuroscience:, Jul. 2016, 13 pages vol. 10, Article 333.

* cited by examiner

NOISE AND BOUND MANAGEMENT FOR RPU ARRAY

BACKGROUND

Technical Field

The present invention relates generally to resistive processing units and, in particular, to noise and bound management for a Resistive Processing Unit (RPU) array.

Description of the Related Art

A RPU is an array of resistive devices that can be used for deep neural network training that are composed of fully connected layers, convolution layers, recurrent layers, and so forth. The vector-matrix multiplication performed on a RPU array is analog in nature and therefore prone to various sources of noise (also referred to herein as the "noise problem"). Also, the results of the vector-matrix multiplication is an analog voltage and therefore the results are bounded by the signal limits imposed by the circuits (also referred to herein as the "bound problem").

Thus, there is a need for noise and bound management for a RPU array that addresses the aforementioned noise problem and bound problem.

SUMMARY

According to an aspect of the present invention, a method is provided for noise and bound management for a Resistive Processing Unit (RPU) array having, an op-amp. The method includes reducing the noise in an output signal from the RPU array by using a largest value, in a sigma vector having a plurality of values, as a representation for a window for an input signal to the RPU array. The input signal to the RPU array is formed from the plurality of values. The method further includes sensing saturation at an output of the op-amp. The method also includes managing the bound to eliminate the saturation by reducing the plurality of values from which the input signal to the RPU is formed. Hence, the method provides noise and bound management for a RPU array that overcomes the aforementioned noise problem and the bound problem suffered by RPU arrays.

A corresponding computer program product and circuit are also provided for noise and bound management for a Resistive Processing Unit (RPU) array having an op-amp.

Moreover, the following preferred features are provided.

According to another aspect of the present invention, the reducing step further includes dividing the sigma vector by the largest value to obtain a quotient and using the quotient as the input signal to the RPU array, and multiplying the output signal from the RPU array by the largest value to obtain a product. Hence, the dividing and multiplying steps allow for the noise management for the RPU array and the corresponding overcoming of the aforementioned noise problem.

According to still another aspect of the present invention, the RPU array is configured to perform an analog vector-matrix multiplication using the quotient as an input signal and the product as the output signal. The use of the quotient and the product as the input and output, respectively, for the analog vector-matrix multiplication provides the noise management for the RPU array and the corresponding overcoming of the aforementioned noise problem.

According to yet another aspect, the managing step is performed iteratively until a number of clipped outputs from the op-amp is below a threshold. In this way, the bound problem can be solved by bound management.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to noise and bound management for a Resistive Processing Unit (RPU) array.

For the sake of illustration, two illustrative methods are described herein to overcome the noise and the bound problems encountered in RPU arrays. Of course, given the teachings of the present invention provided herein, one of ordinary skill in the art will contemplate these and other related methods, while maintaining the spirit of the present invention.

In an embodiment, the input signals can be conditioned in order to get the best analog noise performance while performing a vector-matrix multiplication on a RPU array, thus overcoming the aforementioned noise problem. In addition, the input can be conditioned in order to make sure the results at the output of the RPU array are always within the range of an acceptable voltage swing, thus overcoming the aforementioned bound problem.

A description will now be given regarding noise management for a RPU array, in accordance with an embodiment of the present invention.

The noise specification for the forward pass/cycle (hereinafter "forward pass" is a lot more relaxed compared to the noise specification for the backward pass/cycle (hereinafter "backward pass").

In the forward pass, non-linear functions such as tanh, sigmoid ($\delta$) and softmax layers already produce an output as [0,1] or [−1,1]. For the forward pass, there exists signals that are very close to unity.

For the backward pass, there are cases where all error signals are small. For example, correctly classified inputs produce very small gradients.

A description will now be given regarding problems with noise management.

Figure 1:
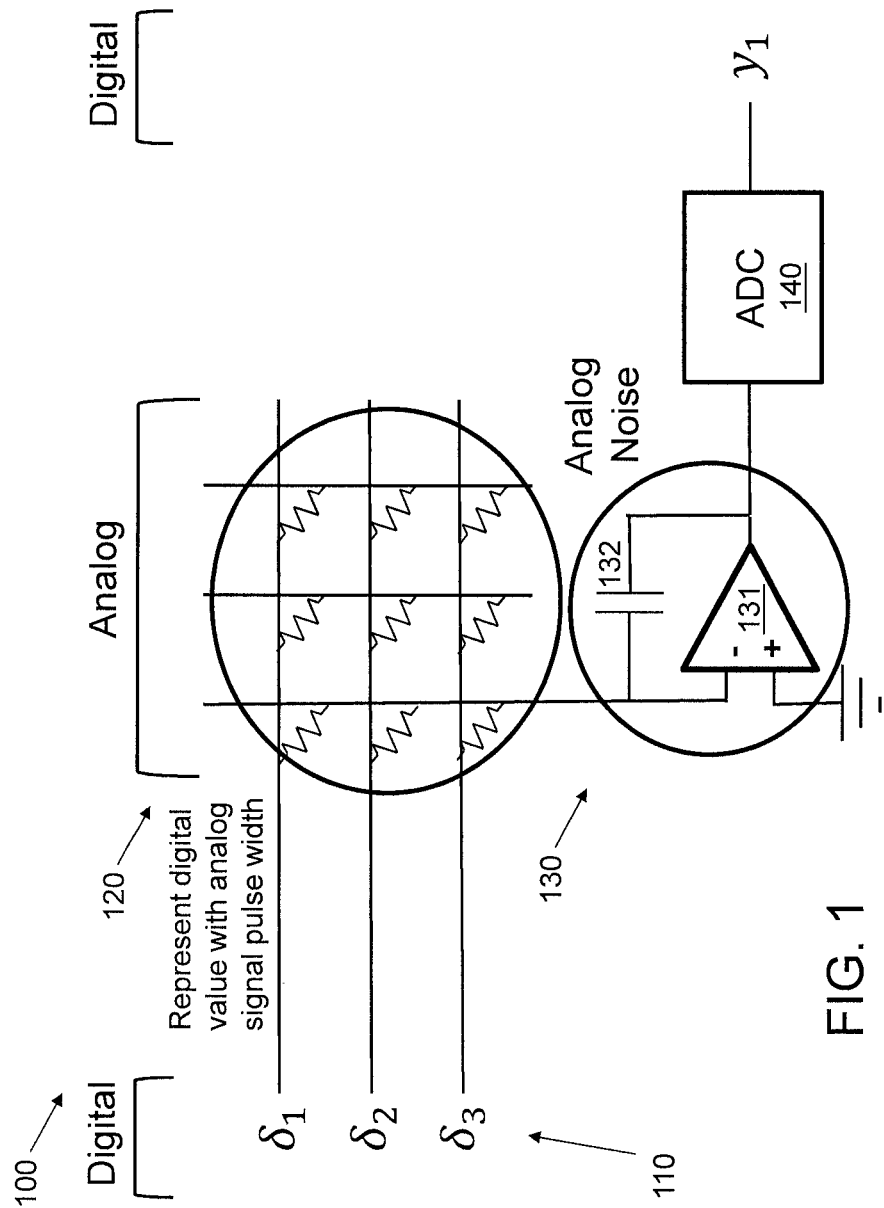
FIG. 1 shows an exemplary analog vector-matrix multiplication on a RPU array, in accordance with an embodiment of the present invention.

FIG. 1 shows an exemplary analog vector-matrix multiplication 100 on a RPU array, in accordance with are embodiment of the present invention.

The analog vector-matrix multiplication 100 involves a set of digital input clues ($\delta$) 110, where each of the digital input values ($\delta$) 110 is represented by a respective analog signal pulse width 120. The analog signal pulse widths 120 are provided as inputs to the array and the generated current signals are input to an operational amplifier (op-amp) integrating circuit 130 having, an op-amp 131 with a capacitor ($C_{int}$) 132 connected to (across) the inverting input of the op-amp 131 and the output of the op-amp 131. The non-inverting input of the op-amp 131 is connected to ground. The output of the op-amp 131 is also connected to an input of an Analog-to-Digital Converter (ADC) 140. The ADC 140 outputs a signal y1, representing a (digitized) result of the analog vector-matrix multiplication 100 on the RPU array.

A complete integration time typically is 80 ns. However, for the complete integration time (80 ns), analog noise is accumulated at the op-amp 131. When the input values ($\delta$) 110 get too small (e.g., such as for the backward pass), the output signal is buried by the noise integrated for a cycle (SNR~0) and produces an incorrect result (i.e., y=W.$\delta$+ noise,W.$\delta$<<noise).

Although the actual pulse duration is much shorter than the complete integration time, the ADC 140 waits for a complete cycle to evaluate the analog output from the op-amp 131.

In an embodiment of the present invention, instead using 80 ns as the representation for unity, we can use the largest number in $\delta$ vector as the representation for 80 ns. The rest of the signals can be scaled with respect to this choice. Thus, the result will be in the units of the largest number in $\delta$. This gives a much better noise performance for the results.

Figure 2:
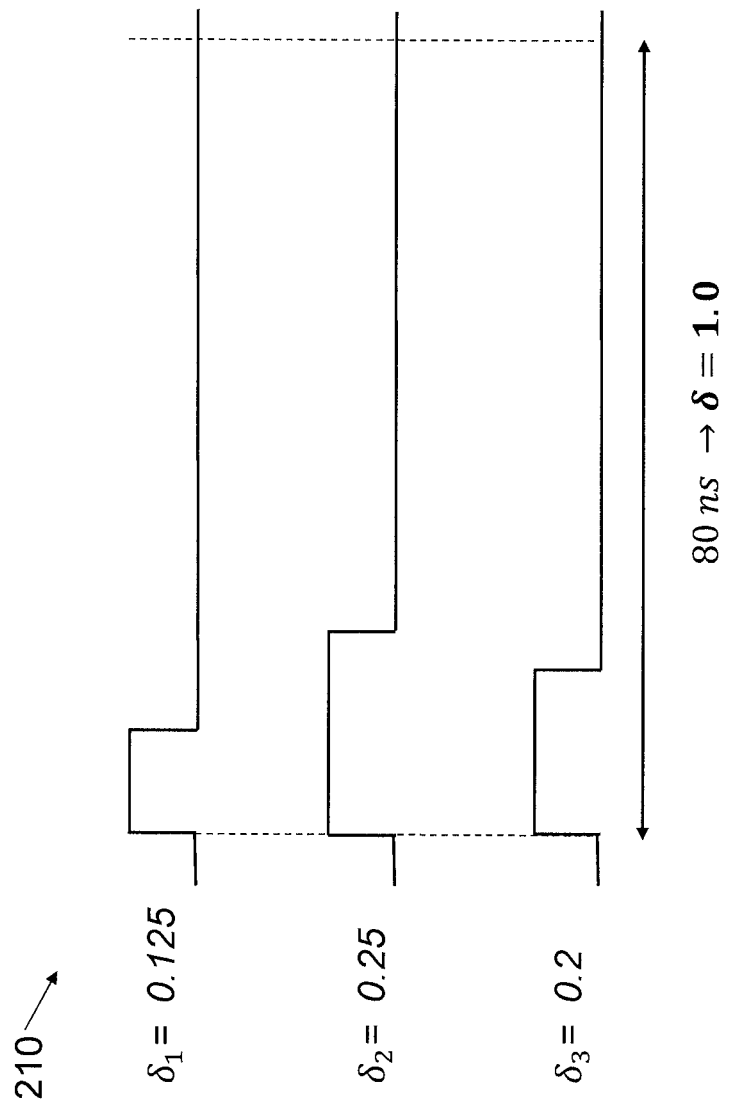
FIG. 2 shows exemplary input signals relating to an ineffective usage of integration time, in accordance with an embodiment of the present invention.

FIG. 2 shows exemplary input signals 210 relating to an ineffective usage of integration time, in accordance with an embodiment of the present invention.

The input signals 210 include $\delta_1$, $\delta_2$, and $\delta_3$, where $\delta_1$=0.125, $\delta_2$=0.25, and $\delta_3$=0.2. In the example of FIG. 2, 80 ns→$\delta$=1.0.

Figure 3:
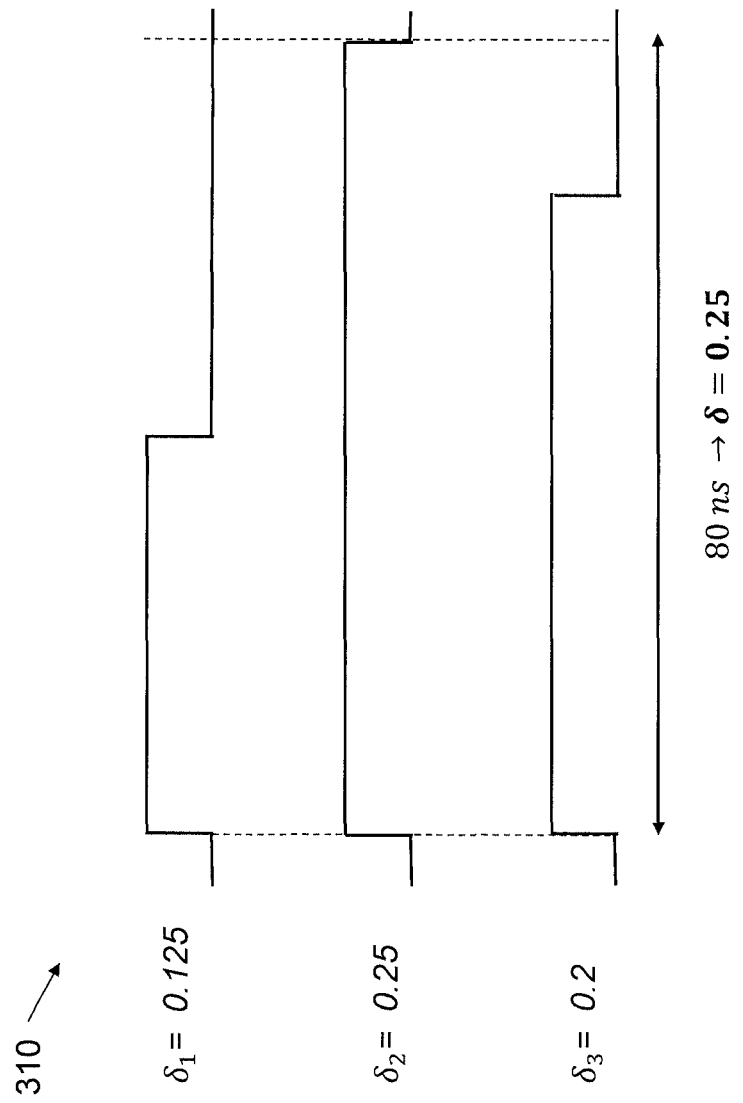
FIG. 3 shows exemplary input signals relating to an effective usage of integration time, in accordance with an embodiment of the present invention.

FIG. 3 shows exemplary input signals 310 relating to an effective usage of integration time, in accordance with an embodiment of the present invention. The input signals 210 include $\delta_1$, $\delta_2$, and $\delta_3$, where $\delta_1$=0.125, $\delta_2$=0.25, and $\delta_3$=0.2. In the example of FIG. 3, 80 ns→$\delta$=0.25.

Figure 4:
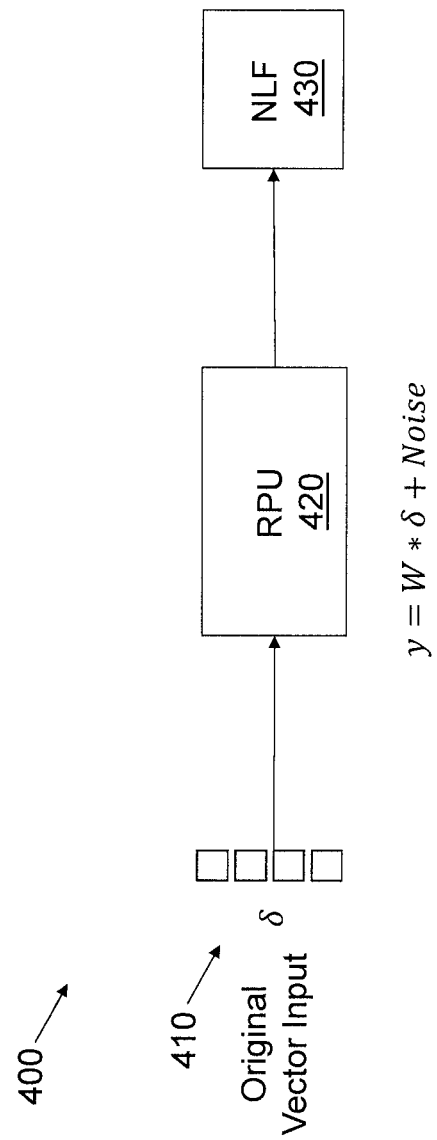
FIG. 4 shows an exemplary operation performed by the array computations to which the present invention can be applied, in accordance with an embodiment of the present invention.

FIG. 4 shows an exemplary operation $00 performed by the array computations to which the present invention can be applied, in accordance with an embodiment of the present invention.

The operation 400 involves providing an original vector input $\delta$ 410 to a resistive processing unit (RPU) 420. An output of the RPU 420 is provided to an input of a Non-Linear Function (NLF) 430. The output from the RPU 420 is as follows: y=W*$\delta$+Noise.

Figure 5:
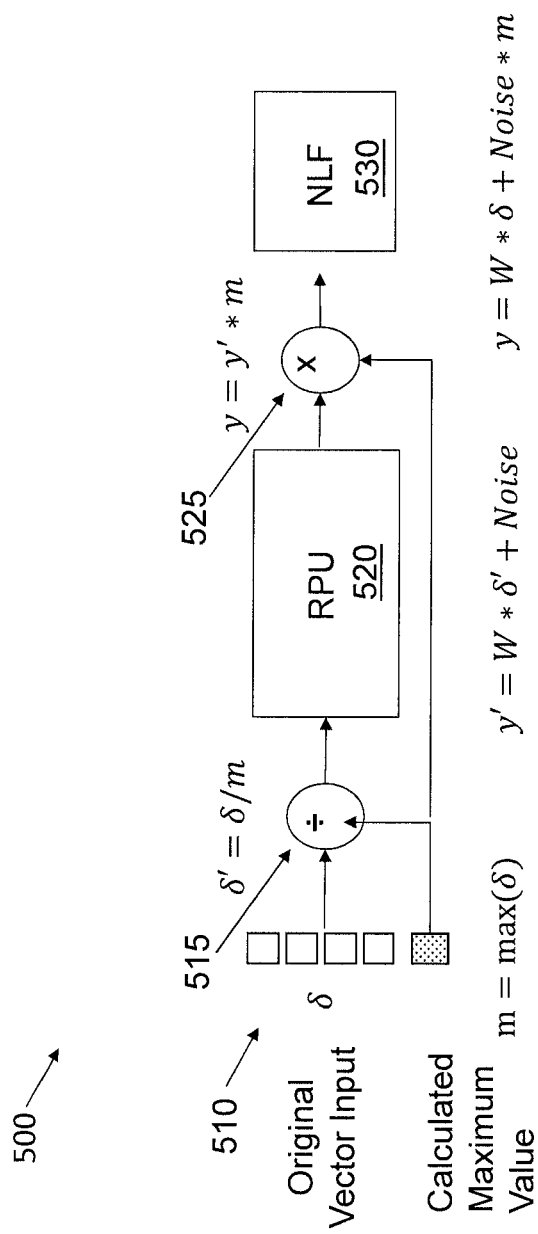
FIG. 5 shows another exemplary operation performed by the array computations, in accordance with an embodiment of the present invention.

FIG. 5 shows another exemplary operation 500 performed by the array computations, in accordance with an embodiment of the present invention.

The operation 500 involves providing an original vector input $\delta$ 510. A maximum value m is calculated from the original vector input $\delta$ 510, where m=max($\delta$). The input vector $\delta$ 510 and the maximum value m are provided as inputs to a divider 415 that calculates $\delta'$=$\delta$/m. $\delta'$ is then provided to a RPU (y'), which outputs y', where y'=W*$\delta'$+ Noise. The output of the RPU (y') and the maximum value m are provided to a multiplier 525 that calculates y, where y=y'*m. The output y of the multiplier 525 is then provided to a NLF 530. The output from the NLF 530 is y=W*$\delta$+ Noise*m.

A description will now be given regarding some of the many attendant benefits of the proposed noise management technique in accordance with an embodiment of the present invention. One benefit is that the integration time is used effectively, providing noise reduction for the vector-matrix multiplication operations. Another benefit is that noise is effectively reduced by the maximum value in the input vector (that is smaller than unity).

Figure 6:
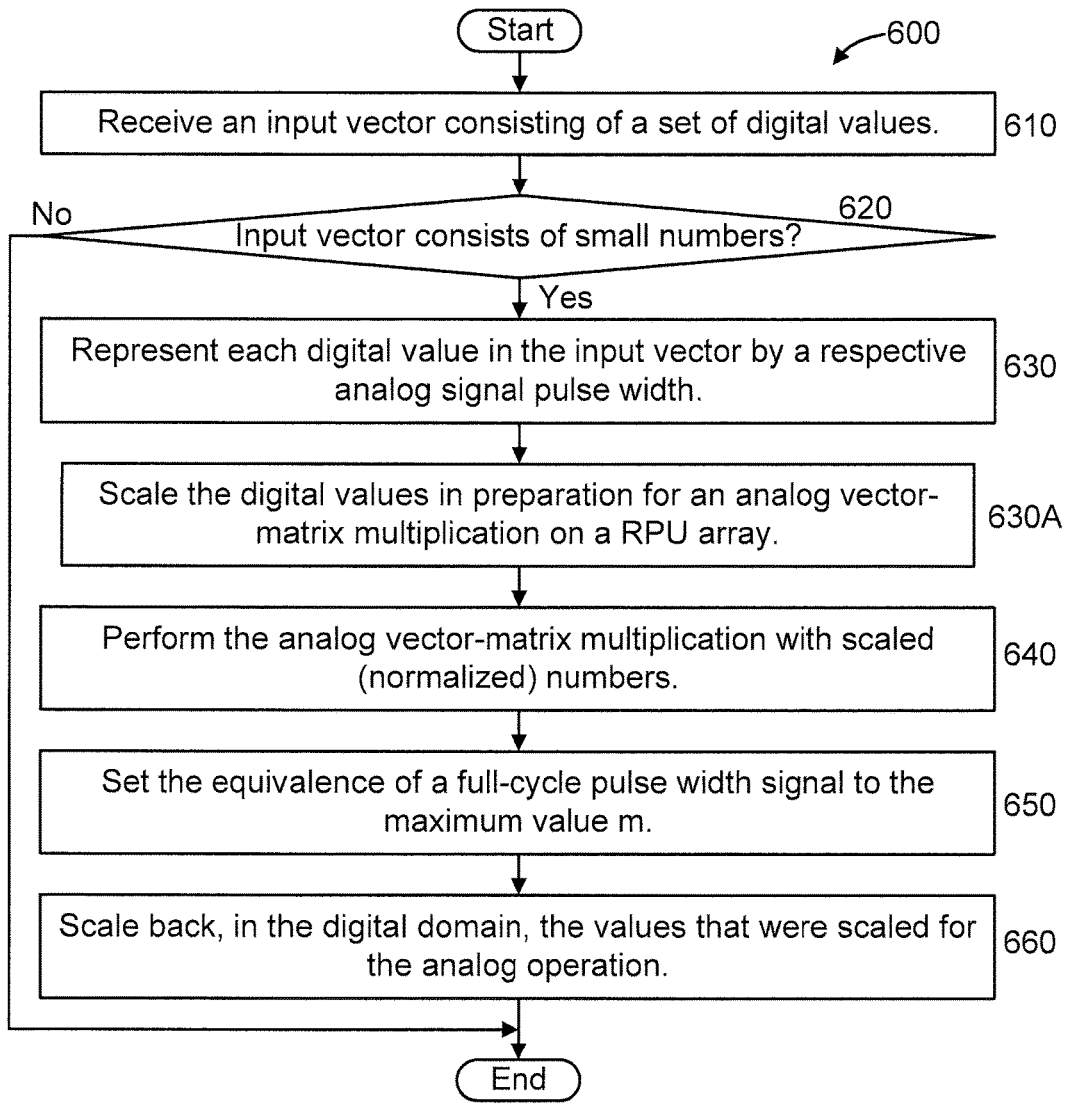
FIG. 6 shows an exemplary method for noise management for an RPU array, in accordance with an embodiment of the present invention.

FIG. 6 shows an exemplary method 600 for noise management for an RPU array, in accordance with an embodiment of the present invention.

At step 610, receive an input vector consisting of a set of digital values.

At step 620, determine whether the input vector consists of small numbers. The determination can be based on, for example, a threshold. If so, then proceed to step 630. Otherwise, the method is terminated.

At step 630, represent each digital value in the input vector by a respective analog signal pulse width.

In an embodiment, step 630 includes step 630A.

At step 630A, scale the digital values in preparation for an analog vector-matrix multiplication on a RPU array. For example, scale the digital values such that all $\delta_j$ in $\delta$ is divided to the maximum value m in $\delta$ before the vector-matrix multiplication is performed on the RPU array.

At step 640 perform the analog vector-matrix multiplication with the scaled numbers $\delta'$ ($\delta'$=$\delta$/m), which enable noise reduction during computation. We note that this division operation is performed on digital circuits and ensures that at least one signal at the input of an RPU array exists for the whole integration time corresponding to unity. After the results of the vector-matrix multiplication is read from an RPU array and convened back to digital signals, we rescale the results by the same amount m(y=y'*m). The noise reduction operation includes (i) finding the maximum value (m) from among the digital values in the input vector, (ii) a division operation ($\delta'$=$\delta$/m), and (iii) a multiplication operation (y=y'*m). Thus, the noise reduction operation includes three operations (finding maximum, division and multiplication) per neuron (O(n)), each of which is computed outside of the RPU. In an embodiment, dedicated hardware can be used (e.g., ASIC, and so forth). In another embodiment, one or more NLFs can be programmed to perform the three operations. It is to be appreciated that the noise reduction operation of step 640 provides the novel advantage of solving the aforementioned noise problem suffered by RPU arrays.

At step 650, set the equivalence of full-cycle pulse width signal to the maximum value m.

At step 660, scale back, in the digital domain, the values that were scaled for the analog operation.

A description will now be given regarding problems with bound management.

Figure 7:
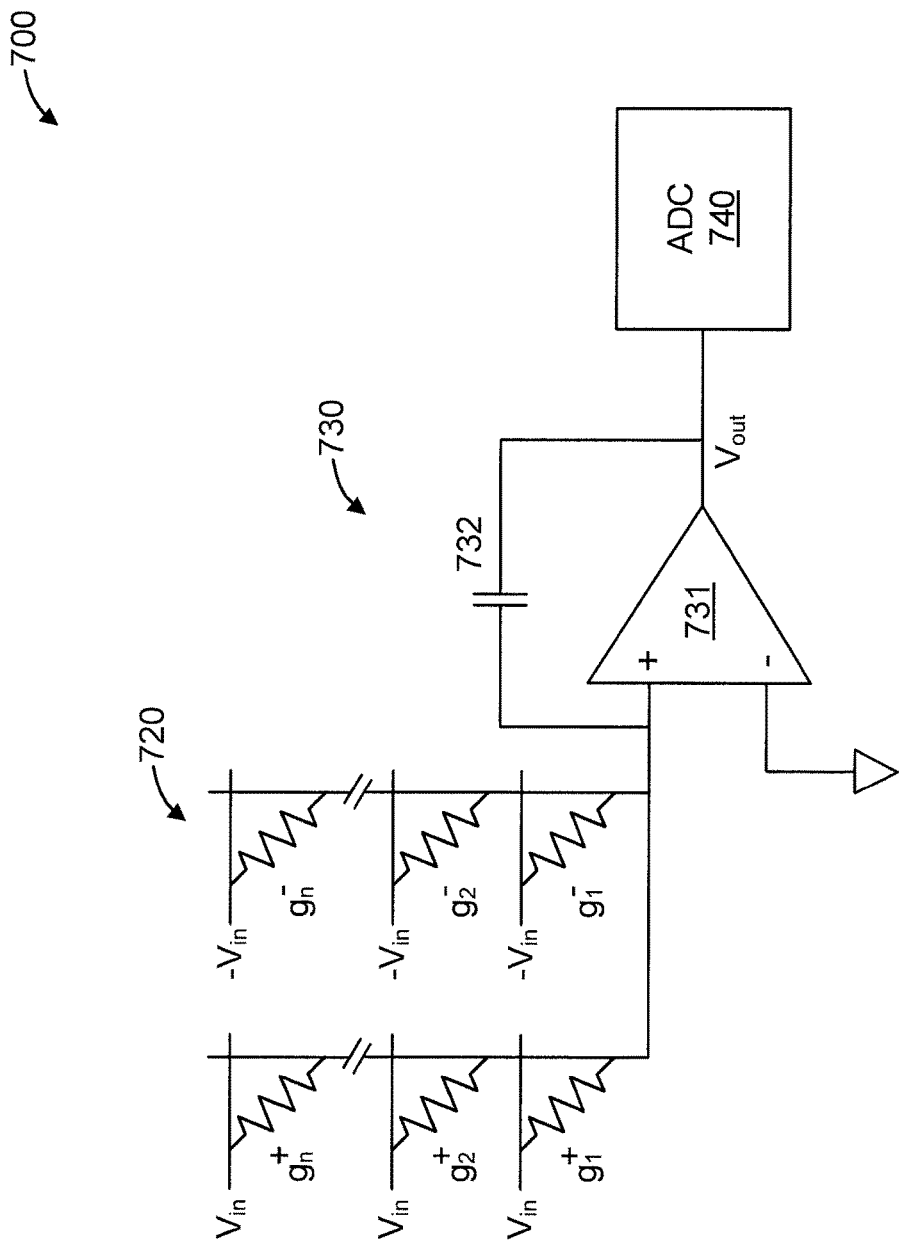
FIG. 7 shows another exemplary analog vector-matrix multiplication on a RPU array, in accordance with an embodiment of the present invention.

FIG. 7 shows another exemplary analog vector-matrix multiplication 700 on a RPU array, in accordance with an embodiment of the present invention. The multiplication 700 is essentially that shown in FIG. 1, using a different format (representation).

The analog vector-matrix multiplication 700 involves a set of input values 720 applied to an inverting input of an op-amp integrating circuit 730. The op-amp integrating circuit 730 includes an op-amp 731 with a capacitor ($C_{int}$) 732. The input values 720 correspond to an input voltage $V_{in}$ and corresponding transconductances $g_1^+$ through $g_n^+$ and $g_1^-$ through $g_n^-$. A non-inverting input of the op-amp 731 is connected to ground. The capacitor is connected to (across) the inverting input of the op-amp 731 and the output of the op-amp 731. The output of the op-amp is also connected to an input of an Analog-to-Digital Converter (ADC) 740. The op amp 731 outputs a signal $V_{out}$, representing a result of the analog vector-matrix multiplication 700 on the RPU array. The ADC 740 converts the analog output $V_{out}$ from the op-amp 731 into a digital signal.

Operations made through the RPU have bounded output values coming from the saturation of the integrating op-amp circuit 730 and limits of the ADC 740. Thus, there will always be bounds and expanding them is expensive.

The relative information beyond the bound values are lost due to clipping.

It has been shown that sigmoid is less sensitive to this bound. Hence, a bound of, e.g., 3 can be enough. In contrast, softmax requires a much larger bound that is about 12 for the algorithm to converge. It is to be appreciated that some algorithms may require even larger bounds such as, for example, an algorithm for a Convolutional Neural Network (CNN).

If this problem is not handled, correct classification rates beyond certain points cannot be reached, and with the false represented gradients, the test error bounces back, carrying the network to a meaningless point.

Figure 8:
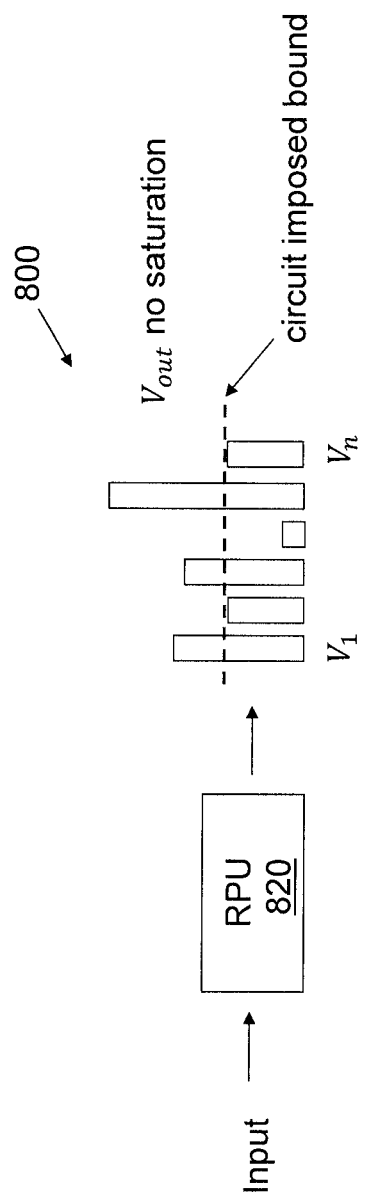
FIG. 8 shows an exemplary op-amp output signal ($V_{out}$) without saturation, in accordance with an embodiment of the present invention.

FIG. 8 shows an exemplary op-amp output signal ($V_{out}$) 800 without saturation, in accordance with an embodiment of the present invention.

As shown in FIG. 8, upon providing an input to a RPU 820, signals $V_1$ through $V_n$ (from which $V_{out}$ is calculated) are output with saturation and corresponding clipping.

Figure 9:
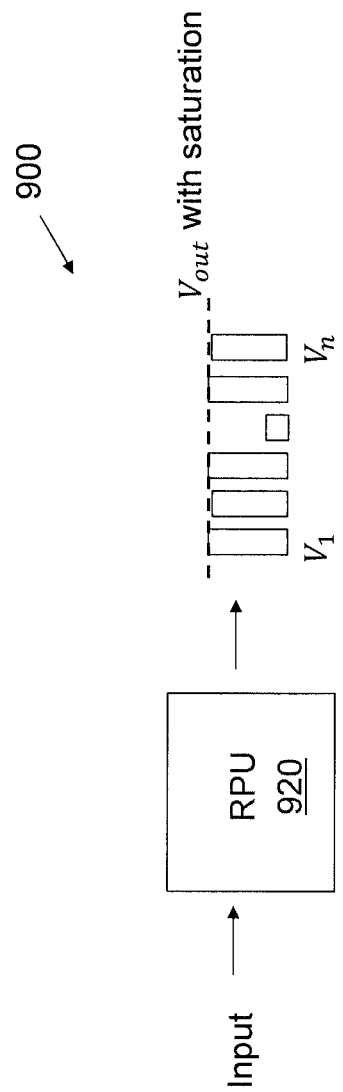
FIG. 9 shows an exemplary op-amp output signal ($V_{out}$) with saturation to which the present invention can be applied, in accordance with an embodiment of the present invention.

FIG. 9 shows an exemplary op-amp output signal ($V_{out}$) 900 with saturation to which the present invention can be applied, in accordance with an embodiment of the present invention.

As shown in FIG. 9, upon providing an input to a RPU 920, signals $V_1$ through $V_n$ (from which $V_{out}$ is calculated), some of the signals (relative to FIG. 8) are saturated and clipped.

Figure 10:
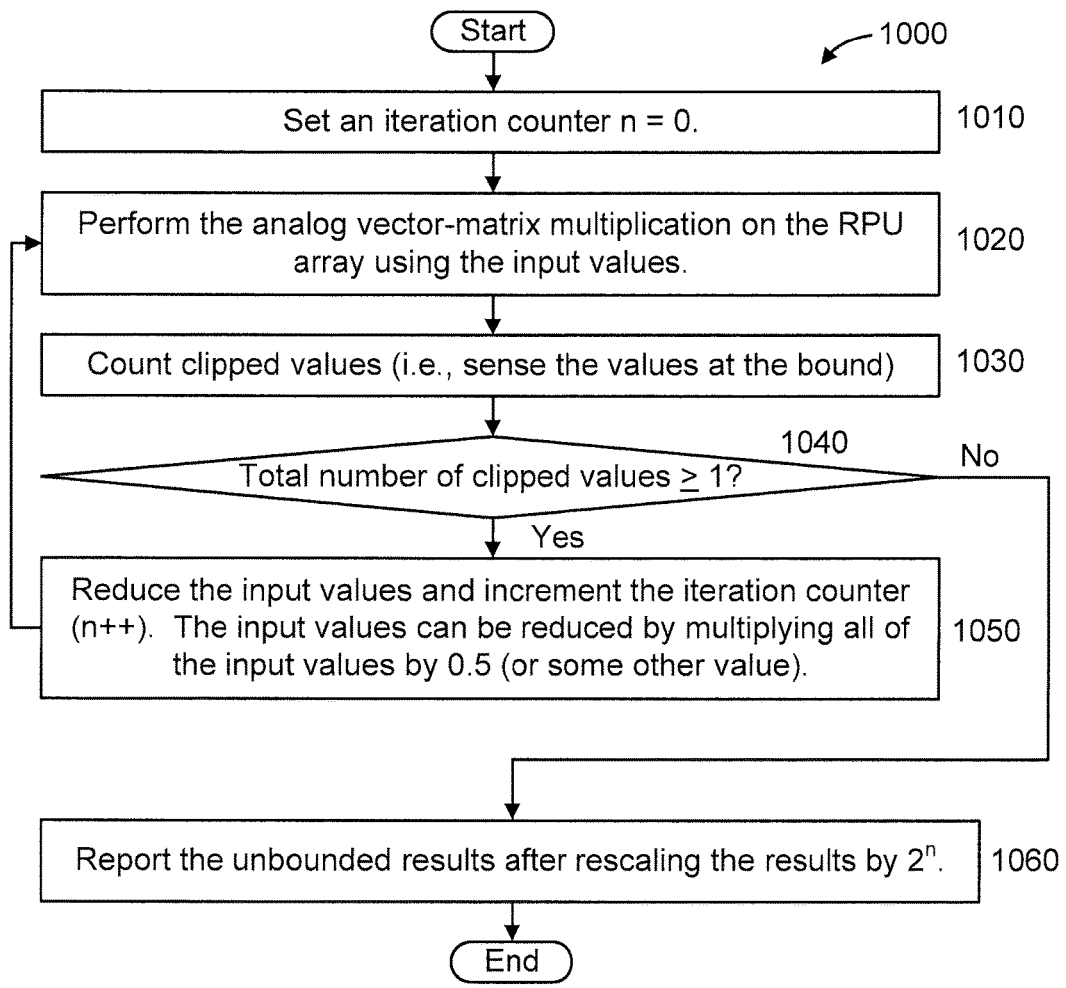
FIG. 10 shows an exemplary method for bound management for saturation in a RPU array, in accordance with an embodiment of the present invention.

FIG. 10 shows an exemplary method 1000 for bound management for saturation in a RPU array, in accordance with an embodiment of the present invention.

At step 1010, set an iteration counter n=0.

At step 1020, perform the analog vector-matrix multiplication on the RPU array using the input values.

At step 1030, count clipped values (i.e., sense the values at the bound).

At step 1040, determine whether the total number of clipped values is greater than or equal to 1. If so, then proceed to step 1050. Otherwise, proceed to step 1060.

At step 1050, reduce the input values (in order to scale down the input values), increment the iteration count (n++), and return to step 1020. In an embodiment, the input values can be reduced by multiplying all of the input values by 0.5 (or some other value, as readily appreciated by one of ordinary skill in the art, given the teachings of the present invention provided herein). It is to be appreciated that the reduction of input values essentially forms a bound management operation that provides the novel advantage of solving the aforementioned bound problem suffered by RPU arrays.

At step 1060, report the unbounded results after rescaling the results by $2^n$.

Figure 11:
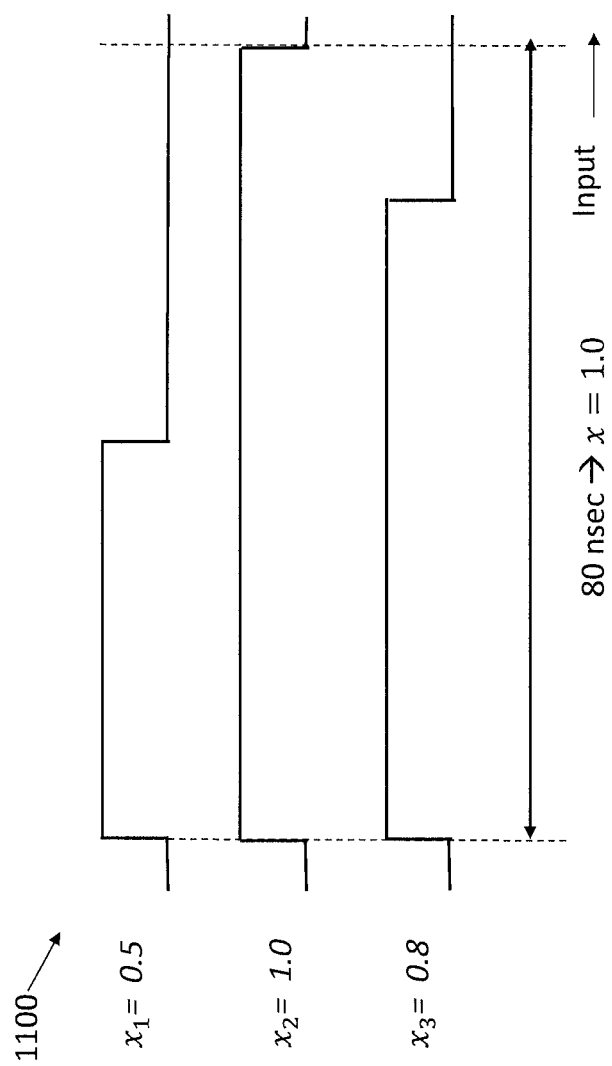
FIG. 11 shows an exemplary saturation condition, in accordance with an embodiment of the present invention.

FIG. 11 shows an exemplary saturation condition 1100, in accordance with an embodiment of the present invention. The exemplary saturation condition 1100 involves a strong signal saturates the op-map. In the example, the input signals to the op-amp involves signals $x_1$, $x_2$, and $x_3$, where $x_1$=0.5, $x_2$=1.0, and $x_3$=0.8. Hence, for an integration time of 80 ns→x=1.0.

Figure 12:
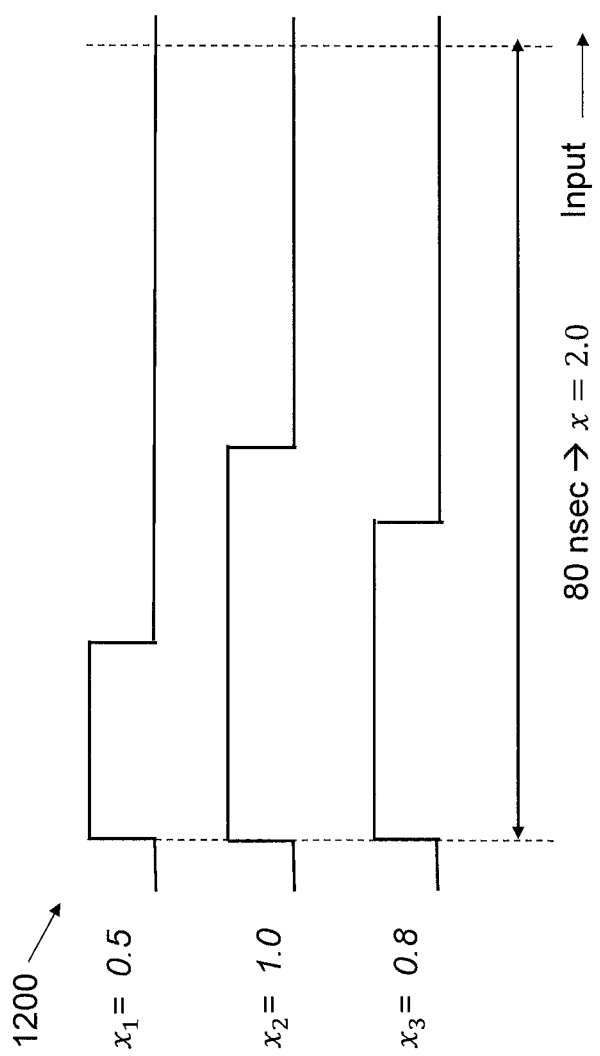
FIG. 12 shows an exemplary saturation elimination condition, in accordance with an embodiment of the present invention.

FIG. 12 shows an exemplary saturation elimination condition 1200, in accordance with an embodiment of the present invention. The exemplary saturation elimination condition 1200 involves signals $x_1$, $x_2$, and $x_3$, where $x_1$=0.5, $x_2$=1.0, and $x_3$=0.8. As can be see, the sig al magnitude of signals $x_1$, $x_2$, and $x_3$ in FIG. 12 is at a high level for half the time relative to signals $x_1$, $x_2$, and $x_3$ in FIG. 11. Hence, for an integration time of 80 ns→x=2.0.

Thus, when a saturation is sensed, the forward pass can be repeated with reduced input signal strengths until all input signals are below saturation.

By scaling down the input signals until the number of over-bound values are satisfactorily low, the saturation problem can be solved with only increasing the number of forward passes made. For this purpose, an interrupt circuit can be established with a simple comparator as a sensor, or the output of the ADC can be used to check the saturation digitally.

The NLF can decide to repeat the operation or not. For example, for the sigmoid layer, non-linear bounds do not cause any problems. However, for the softmax layer, reading unbounded signals are crucial for healthy learning. The bound management method of the present invention completely eliminates the saturation problem.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage, medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers ad/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for noise and bound management for a Resistive Processing Unit (RPU) array having an op-amp, the method comprising:
   reducing the noise in an output signal from the RPU array by using a largest value, in a sigma vector having a plurality of values, as a representation for a window for an input signal to the RPU array, the input signal to the RPU array being formed from the plurality of values;
   sensing saturation at an output of the op-amp; and
   managing the bound to eliminate the saturation by reducing the plurality of values from which the input signal to the RPU is formed.

2. The method of claim 1, wherein the RPU array is configured to perform an analog vector-matrix multiplication.

3. The method of claim 1, wherein the reducing step further comprises scaling remaining ones of the plurality of values with respect to the largest value.

4. The method of claim 1, wherein the managing step reduces the plurality of values in one or more additional forward passes by the RPU array.

5. The method of claim 1, wherein the reducing step further comprises:
   dividing the sigma vector by the largest value to obtain a quotient and using the quotient as the input signal to the RPU array; and
   multiplying the output signal from the RPU array by the largest value to obtain a product.

6. The method of claim 5, wherein the quotient forms a conditioned input signal to the RPU array, and the product forms a conditioned output signal from the RPU array.

7. The method of claim 5, wherein the RPU array is configured to perform an analog vector-matrix multiplication using the quotient as an input signal and the product as the output signal.

8. The method of claim 1, wherein the sigma vector is comprised in a digital signal having a plurality of digital values, and the input to the RPU unit comprises a plurality of analog signal pulse width values each of which represents a respective one of the plurality of digital values.

9. The method of claim 1, wherein the managing step is performed iteratively until a number of clipped outputs from the op-amp is below a threshold.

* * * * *